United States Patent
Kim et al.

(10) Patent No.: US 9,697,294 B2
(45) Date of Patent: Jul. 4, 2017

(54) METHOD AND APPARATUS FOR MANAGING CONTENTS BY USING CONTENT TAG

(75) Inventors: Il-joo Kim, Seoul (KR); Ho Jin, Yongin-si (KR); Young-chul Sohn, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 680 days.

(21) Appl. No.: 12/571,619

(22) Filed: Oct. 1, 2009

(65) Prior Publication Data

US 2010/0191755 A1    Jul. 29, 2010

(30) Foreign Application Priority Data

Jan. 28, 2009 (KR) .................. 10-2009-0006651

(51) Int. Cl.
| | | |
|---|---|---|
| G06F 7/00 | (2006.01) | |
| G06F 17/30 | (2006.01) | |
| H04N 21/218 | (2011.01) | |
| H04N 21/63 | (2011.01) | |
| H04N 21/81 | (2011.01) | |

(52) U.S. Cl.
CPC ... *G06F 17/30876* (2013.01); *H04N 21/2181* (2013.01); *H04N 21/632* (2013.01); *H04N 21/8133* (2013.01)

(58) Field of Classification Search
None
See application file for complete search history.

(56) References Cited

U.S. PATENT DOCUMENTS

| | | | | |
|---|---|---|---|---|
| 5,649,196 | A * | 7/1997 | Woodhill et al. ...... | 707/999.202 |
| 6,574,609 | B1 * | 6/2003 | Downs et al. .................. | 705/50 |
| 7,073,036 | B2 * | 7/2006 | Furuya et al. ......... | 707/999.202 |
| 7,089,445 | B2 * | 8/2006 | Kaiya et al. ..................... | 714/2 |
| 7,529,834 | B1 * | 5/2009 | Birrell et al. .......... | 707/999.202 |
| 7,610,296 | B2 * | 10/2009 | Hughes et al. ......... | 707/999.01 |
| 7,747,574 | B1 * | 6/2010 | Svendsen ...................... | 707/640 |
| 8,099,605 | B1 * | 1/2012 | Billsrom et al. .............. | 713/187 |
| 8,140,439 | B2 * | 3/2012 | Olson et al. ..................... | 705/57 |
| 2001/0056463 | A1 * | 12/2001 | Grady et al. .................. | 709/203 |
| 2004/0034502 | A1 | 2/2004 | Jung | |
| 2006/0293077 | A1 * | 12/2006 | Aaltonen et al. ............. | 455/551 |

(Continued)

FOREIGN PATENT DOCUMENTS

| | | | |
|---|---|---|---|
| KR | 10-2004-0049498 A | 6/2004 | |
| KR | 10-2003-0001541 A | 1/2006 | |

(Continued)

OTHER PUBLICATIONS

Communication issued Nov. 26, 2015, issued by the Korean Intellectual Property Office in counterpart Korean Patent Application No. 10-2009-0006651, 6 pages in Korean and English.

(Continued)

*Primary Examiner* — Jau-Shya Meng
(74) *Attorney, Agent, or Firm* — Sughrue Mion, PLLC

(57) ABSTRACT

Provided is a method of managing contents, the method including selecting at least one of the stored contents, generating a content tag including content information associated with the selected content, storing the generated content tag, transmitting the generated content tag to an external device, and deleting the selected content.

18 Claims, 8 Drawing Sheets

(56) References Cited

U.S. PATENT DOCUMENTS

2007/0112850 A1\* 5/2007 Flynn et al. ............... 707/104.1
2007/0276838 A1\* 11/2007 Abushanab ....... G06F 17/30067
2008/0310267 A1 12/2008 Hattori et al.

FOREIGN PATENT DOCUMENTS

KR 10-2006-0090108 A 8/2006
KR 10-2008-0109636 A 12/2008

OTHER PUBLICATIONS

Communication dated May 26, 2015, issued by the Korean Intellectual Property Office in counterpart Korean Patent Application No. 10-2009-0006651.

\* cited by examiner

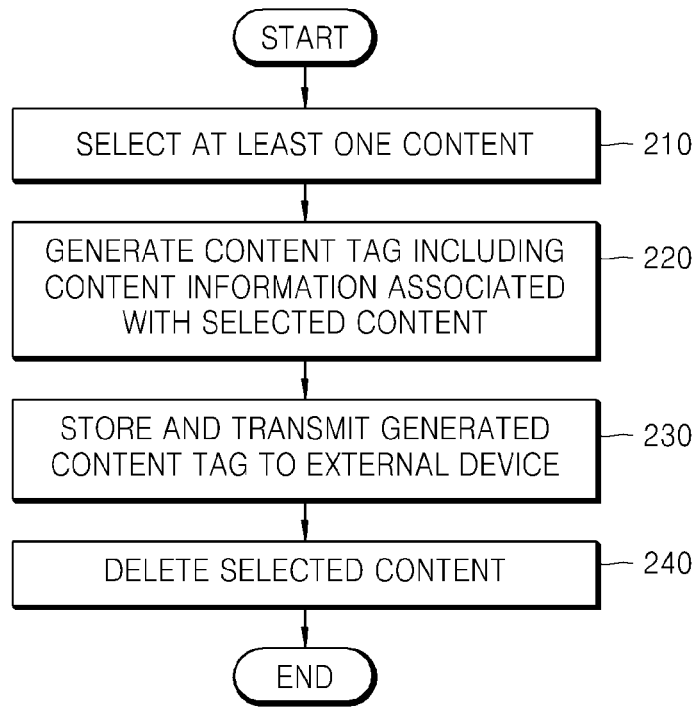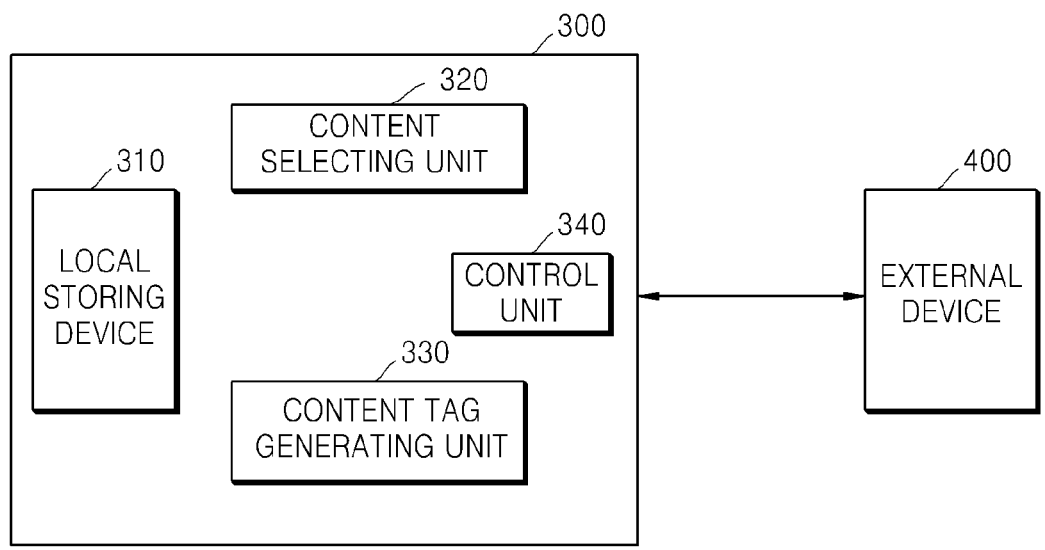

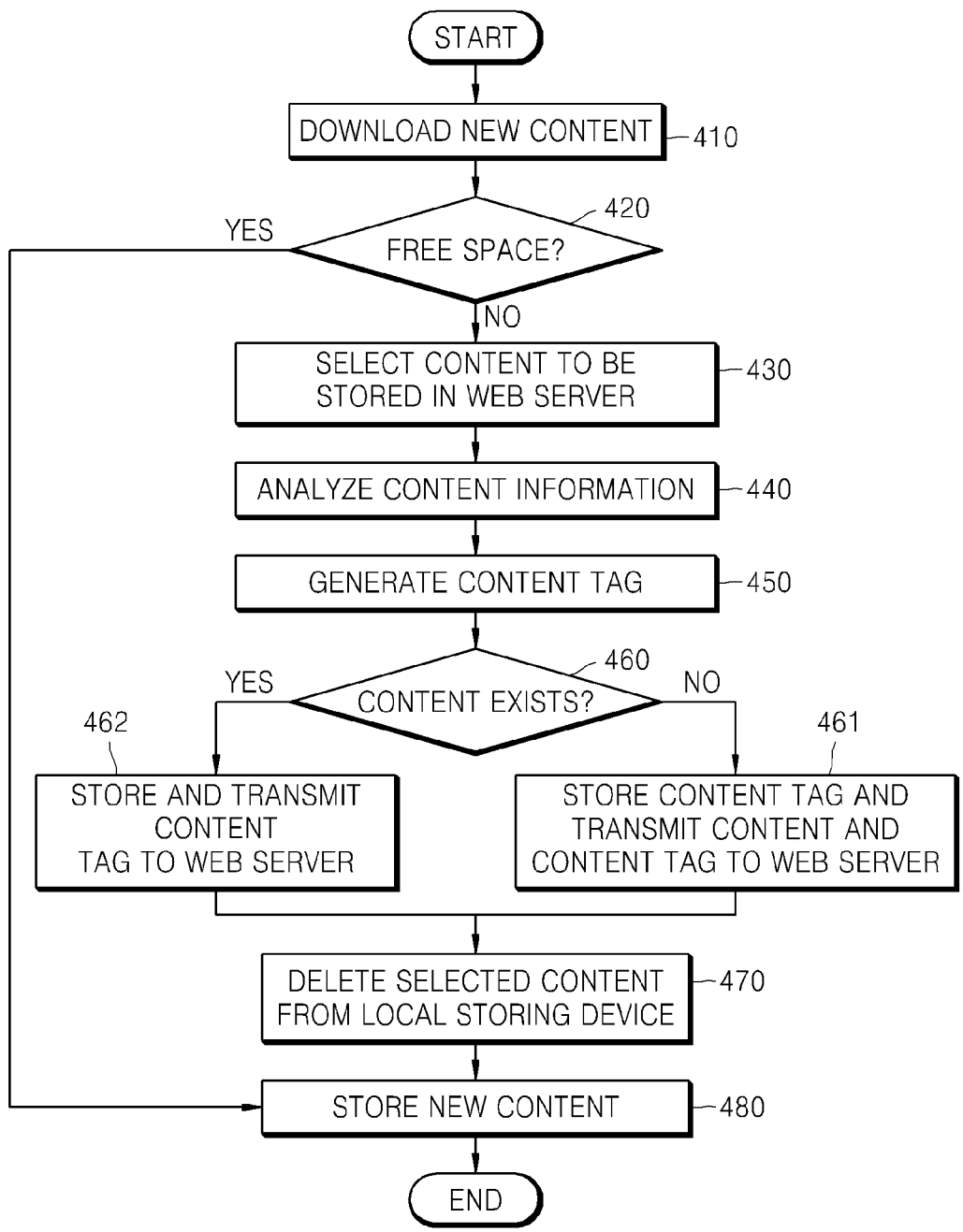

METHOD AND APPARATUS FOR MANAGING CONTENTS BY USING CONTENT TAG

CROSS-REFERENCE TO RELATED PATENT APPLICATION

This application claims the benefit of Korean Patent Application No. 10-2009-0006651, filed on Jan. 28, 2009, in the Korean Intellectual Property Office, the disclosure of which is incorporated herein in its entirety by reference.

BACKGROUND OF THE INVENTION

Field of the Invention

Methods and apparatuses consistent with the present invention relate to managing contents.

SUMMARY OF THE INVENTION

Exemplary embodiments of the present invention provide a method and apparatus for efficiently managing contents.

According to an aspect of the present invention, there is provided a method of managing contents by using content tag. The method includes selecting at least one of the stored contents, generating content tag including content information associated with the selected content, storing the generated content tag, transmitting the generated content tag to an external device, and deleting the selected content.

In the method according to an exemplary embodiment of the present invention, the selecting of the at least one of the stored contents may be performed in a predetermined deletion priority order which is determined by a server or a user.

In the method according to an exemplary embodiment of the present invention, the content information may be content metadata information which includes at least one of content identification (ID), content storage start time, and content storage end time.

In the method according to an exemplary embodiment of the present invention, the content information may further include a content setting information which includes at least one of content advertisement or additional data selection information and content quality selection information.

In the method according to an exemplary embodiment of the present invention, the storing of the generated content tag and the transmitting to the external device may includes transmitting the selected content to the external device if the selected content does not exist in the external device.

The method according to an exemplary embodiment of the present invention may further include requesting content transmission by transmitting a content tag corresponding to the deleted content to the external device and receiving the deleted content from the external device.

According to another aspect of the present invention, there is provided an apparatus for managing contents by using a content tag. The apparatus includes a storing device storing at least one content, a content selecting unit selecting at least one of the contents stored in the storing device, a content tag generating unit generating a content tag including content information associated with the selected content, and a control unit storing the generated content tag in the storing device, transmitting the generated content tag to an external device, and deleting the selected content.

According to another aspect of the present invention, there is provided a method of managing contents by using a content tag. The method includes selecting at least one of the stored contents, transmitting information associated with the selected content to a server, receiving management information including information about external storing devices which store at least a portion of the selected content from the server, and deleting a portion of total data of the selected content by using the management information.

In the method according to an exemplary embodiment of the present invention, the management information may include at least one of the information about the external storing devices which store at least a portion of the selected content, information about contents stored in the external storing devices, and information about qualities of the contents stored in the external storing devices.

The method according to an exemplary embodiment of the present invention may further include generating and storing a content tag including information about the deleted portion, and transmitting the content tag to the external device.

According to another aspect of the present invention, there is provided an apparatus for managing contents by using a content tag. The apparatus includes a storing device storing at least one content, a content selecting unit selecting at least one of the contents stored in the storing device, and a control unit transmitting information associated with the selected content to a server, receiving management information including information about external storing devices which store at least a portion of the selected content, and deleting a portion of total data of the selected content by using the management information.

According to another aspect of the present invention, there is provided a computer-readable recording medium having recorded thereon a program for executing a method of managing contents by using a content tag, the method including selecting at least one of the stored contents, generating a content tag including content information associated with the selected content, storing the generated content tag, transmitting the generated content tag to an external device, and deleting the selected content.

According to another aspect of the present invention, there is provided a computer-readable recording medium having recorded thereon a program for executing a method of managing contents by using a content tag, the method including selecting at least one of the stored contents, transmitting information associated with the selected content to a server, receiving management information including information about external storing devices which store at least a portion of the selected content from the server, and deleting a portion of total data of the selected content by using the management information.

BRIEF DESCRIPTION OF THE DRAWINGS

The above and other features and aspects of the present invention will become more apparent by describing in detail exemplary embodiments thereof with reference to the attached drawings in which:

FIG. 2 is a flowchart illustrating a method of managing contents by using a content tag, according to an exemplary embodiment of the present invention;

FIG. 3 is a block diagram of an apparatus for managing contents by using a content tag, according to an exemplary embodiment of the present invention;

FIG. 4 is a flowchart illustrating a method of managing contents by using a content tag, according to another exemplary embodiment of the present invention;

DETAILED DESCRIPTION OF THE INVENTION

It is needless to say that the management of contents is important in a flood of contents. Even when contents are managed by using a personal video recorder (PVR), additional content management is required due to the limited capacity of a storage memory such as a hard disk drive (HDD). In an exemplary embodiment of the present invention, a content tag is used for efficient content management.

Hereinafter, exemplary embodiments of the present invention will be described in detail with reference to the accompanying drawings.

Figure 1:
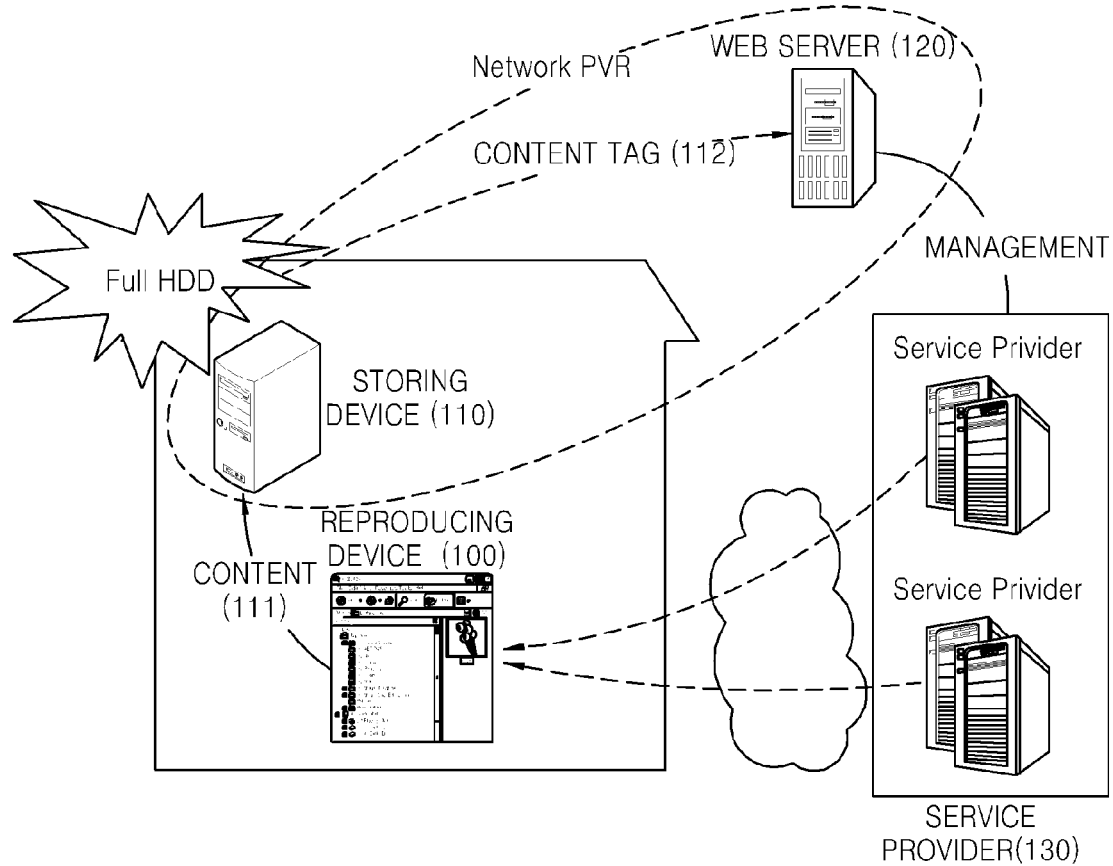
FIG. 1 is a schematic diagram for explaining a method of managing contents by using a content tag, according to an exemplary embodiment of the present invention.

FIG. 1 is a schematic diagram for explaining a method of managing contents by using a content tag, according to an exemplary embodiment of the present invention.

Referring to FIG. 1, a user receives contents 111 from a service provider 130 that provides the contents 111 and reproduces the received contents 111 in real time with a reproducing device 100 or stores the received contents 111 in a local storing device 110. If the received contents 111 cannot be stored in the local storing device 110 due to an insufficient capacity of the local storing device 110, content which has been stored in the local storing device 110 is deleted and a storage space provided by a web server 120 is used in order to secure a free space in the local storing device 110. In an alternative exemplary embodiment, the reproducing device 100 or the local storing device 110 is in the user's home, as shown in FIG. 1.

For the selection of content to be deleted from the local storing device 110, at least one of the contents 111 stored in the local storing device 110 may be selected in a predetermined deletion priority order. Then information of the selected content is analyzed and extracted, and a content tag 112 is generated using the extracted information. The generated content tag 112 is stored in the local storing device 110 and transmitted to the web server 120, after which the selected content is deleted from the local storing device 110.

The web server 120 may, but not limited to, be a web server which provides a network PVR service or a web server which supports a video on demand (VOD) service, or be the same as the content provider 130 which provides contents, or be another peer in a peer-to-peer (P2P) environment. In an alternative exemplary embodiment, the web server 120 is connected to the reproducing device 110 or the storing device 110 through the Internet. Likewise, in yet another exemplary embodiment, the content provider 130 is connected to the reproducing device 110 or the storing device 110 through the Internet. In one exemplary embodiment, the web server 120 and the service provider 130 are outside the user's home, as shown in FIG. 1.

After deletion of content, the user may reproduce the deleted content by accessing the web server 120 with the content tag 112 stored in the local storing device 110 and using content stored in the web server 120.

A method of managing contents by using the content tag 112, according to an exemplary embodiment of the present invention, will now be described with reference to FIG. 2.

FIG. 2 is a flowchart illustrating a method of managing contents by using a content tag, according to an exemplary embodiment of the present invention.

In operation 210, if a storing device, e.g., a hard disk drive (HDD), of a user device such as a local reproducing device has no free space in its storage region, a processor of the user device selects content to be stored in an external device such as a web server. Herein, the storing device may be an independent storing device which is physically separated from the user device. Selection of the content may be performed in a predetermined deletion priority order.

According to an exemplary embodiment of the present invention, the predetermined deletion priority order may be the order of the oldest generated or stored content first or the order of the most popular content periodically transmitted from the server to the user device first. The predetermined deletion priority order may also be determined based on the frequency of reproduction or the most recent reproduction time in the user device. The predetermined deletion priority order may be determined by the web server to improve the efficiency of the server, or by the user. Alternatively, a new content to be stored may be selected.

In operation 220, information of the content selected in operation 210 is analyzed and extracted and a content tag is generated using the extracted information.

According to an exemplary embodiment of the present invention, the information of the selected content includes at least one of unique information indicating the content, information about the start and end of a portion stored by selection of the user in a total downloaded content, content advertisement selection information, additional data selection information, and content quality selection information.

Herein, the content advertisement selection information or additional data selection information is information indicating a user's selection of whether to store an advertisement or additional data, which has been stored together with content, together with the content. The content quality selection information is information indicating a user's selection of whether to view content of a different quality during the storage of the selected content in the web server if the quality of content stored in a local storing device is different from that of content stored in a web server.

The content tag includes information about the user device which generates the content tag or information about the user, information about the web server that stores content which is identical to the selected content, and information about the selected content.

In operation 230, the generated content tag is stored in the user device and transmitted to the web server. If content which is identical to the selected content does not exist in the web server or if the quality of the selected content is different from that of content stored in the web server, the selected content is transmitted to the web server, together with the content tag.

In operation 240, the selected content is deleted from the storing device of the user device. If the selected content is a new content to be stored, only the content tag is stored in the storing device of the user device.

As such, content is managed by using the web server and only the content tag, instead of the content, is stored in the user device, thereby efficiently using a local storage space. In addition, by storing the content tag in the web server, it is possible to efficiently manage the web server and improve the user's convenience in using the content.

FIG. 3 is a block diagram of an apparatus 300 for managing contents by using a content tag, according to an exemplary embodiment of the present invention.

Referring to FIG. 3, the apparatus 300 according to an exemplary embodiment of the present invention includes a local storing device 310, a content selecting unit 320, a content tag generating unit 330, and a control unit 340.

The local storing device 310 stores one or more pieces of content which are to be managed by the apparatus 300.

The content selecting unit 320 selects content to be stored in an external device 400, e.g., a web server, if there is no free space in the local storing device 310. Herein, the local storing device 310 may be an independent storing device which is physically separated from the apparatus 300. For content selection, at least one of the stored contents is selected in a predetermined deletion priority order. Alternatively, a new content to be stored may be selected.

The content tag generating unit 330 analyzes and extracts information of the content selected by the content selecting unit 320 and generates a content tag by using the extracted information of the content. The content tag includes information about the user device which generates the content tag, i.e., the apparatus 300, or information about the user, information about the external device 400 which stores content that is identical to the selected content, and information about the selected content.

The control unit 340 stores the generated content tag in the apparatus 300, e.g., the local storing device 310, and transmits the content tag to the external device 400. The control unit 340 also deletes the selected content from the local storing device 310. If the selected content is a new content to be stored, only the content tag is stored the local storing device 310.

The apparatus 300 for managing contents, according to the current exemplary embodiment of the present invention, may form a part of a content reproducing device.

FIG. 4 is a flowchart illustrating a method of managing contents by using a content tag, according to another exemplary embodiment of the present invention.

In operation 410, a user device, i.e., an apparatus for managing contents, downloads a new content from a service provider and receives a user command requesting storage of the downloaded content in the apparatus for managing contents.

In operation 420, a processor of the apparatus determines whether a local storing device has a free space for storing the content. If the local storing device has a free space, the new content is stored in the local storing device in operation 480.

In operation 430, if there is no free space in the local storing device, content to be stored in an external device, e.g., a server, is selected. Selection of the content may be performed in a predetermined deletion priority order. Selectively, the content may be selected by a selection signal input from the user.

According to an exemplary embodiment of the present invention, the predetermined deletion priority order may be the order of the oldest generated or stored content first or the order of the most popular content periodically transmitted from the server to the user device first. The predetermined deletion priority order may also be determined based on the frequency of reproduction or the most recent reproduction time in the user device. The predetermined deletion priority order may be determined by the server to improve the efficiency of the server, or by the user. Alternatively, a new content to be stored may be selected.

In operation 440, information of the content selected in operation 430 is analyzed and extracted.

According to an exemplary embodiment of the present invention, the information of the selected content is content metadata information and may further include content setting information.

The content metadata information includes at least one of a content identification (ID) of stored content, a content storage start time, and a content storage end time. The content ID is unique information indicating the content. The content storage start time and the content storage end time are information about the start and end of a portion stored by the selection of the user in a total downloaded content, and are generated when the user stores the content in the local storing device.

The content setting information includes at least one of content advertisement selection information, additional data selection information, and content quality selection information.

The content advertisement selection information or additional data selection information is information indicating a user's selection of whether to store an advertisement or additional data, which has been stored together with content, together with the content. When the content is stored in the local storing device, an advertisement and additional data associated with the content, e.g., an electronic program guide (EPG), a content preview moving picture, and content description data, may be stored together with the content under the control of the processor of the user device. Thus, when the selected content is stored in the web server, whether to continue keeping an advertisement or additional data, which has been stored together with the content, is selected by the user and information indicating the user's selection is generated.

The content quality selection information is information indicating a user's selection of whether to view content of a different quality during the storage of the selected content in the web server if the quality of content stored in a local storing device is different from that of content stored in a web server. For example, a quality of content stored by the user may be a high definition (HD) class, whereas a quality of content stored in the web server may be a standard definition (SD) class. Thus, if the user selects to view only HD-class content, HD-class content may be uploaded to the web server.

According to another exemplary embodiment of the present invention, if a P2P environment is provided, the user may search for another peer which has HD-class content.

The user's selection of whether to view only content of the same quality or to view content of a different quality is input and thus the content quality selection information is generated.

In operation 450, a content tag is generated using the information of the content, which is analyzed and extracted in operation 440. The generated content tag is stored in the local storing device, and will now be described in detail with reference to FIG. 5.

Figure 5:
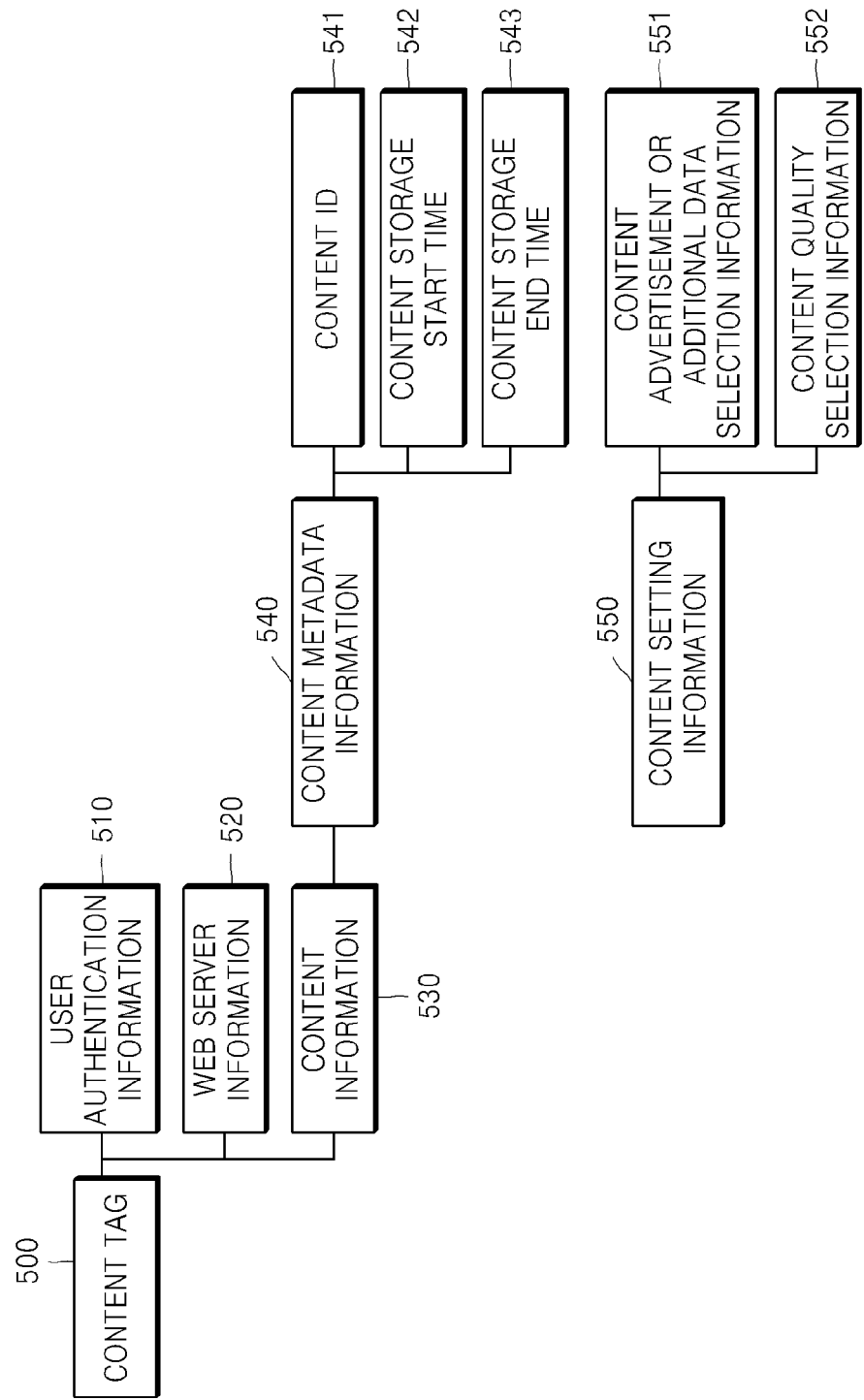
FIG. 5 is a configuration diagram illustrating a content tag according to an exemplary embodiment of the present invention.

FIG. 5 is a configuration diagram illustrating a content tag 500 according to an exemplary embodiment of the present invention. The content tag 500 according to the current exemplary embodiment of the present invention may be described with an extensible markup language (XML), but may also be described in other languages, and may be generated as, but not limited to, a structured text document or binary file.

The content tag 500 includes user authentication information 510, web server information 520, and content information 530.

The user authentication information 510 is information about a user device which generates the content tag 500, or information about a user. To use content after deletion of the content, the user device accesses the web server with the content tag 500 stored in the local storing device and uses content stored in the web server. The web server performs a user authentication procedure to allow only an authorized user to use the content. Selectively, if content corresponding to the content information 530 of the content tag 500 is stored in the web server without the user authentication procedure, the content may be available without user authentication.

The web server information 520 is information about a web server which stores content which is identical to a deleted content. For example, the web server information 520 may include a uniform resource identifier (URI) address or a name of the web server. The user device may access the web server by using the web server information 520 of the content tag 500 stored in the local storing device and use the content.

The content information 530 includes content metadata information 540 and content setting information 550.

The content metadata information 540 includes at least one of a content ID 541 of stored content, a content storage start time 542, and a content storage end time 543.

The content setting information 550 includes at least one of content advertisement selection information, additional data selection information 551, and content quality selection information 552.

In operation 460, it is determined whether the selected content exists in the web server. The content selected for deletion may not exist in the web server or the quality of the content stored in the web server may be different from that of the content stored in the local storing device.

In operation 461, if it is determined that either the identical content or the content of the same quality does not exist in the web server, the content tag for the selected content is generated and stored in the local storing device and then transmitted to the web server. The selected content is also uploaded to the web server.

In operation 462, if it is determined that the identical content or the content of the same quality exists in the web server, the content tag for the selected content is generated and stored in the local storing device and then transmitted to the web server.

In operation 470, the selected content is deleted from the local storing device. If the selected content is a new content to be stored, only the content tag is stored in the local storing device.

In operation 480, the new content, which has not been stored after downloaded due to an insufficient storage space of the local storing device in operation 410, is stored.

Figure 6:
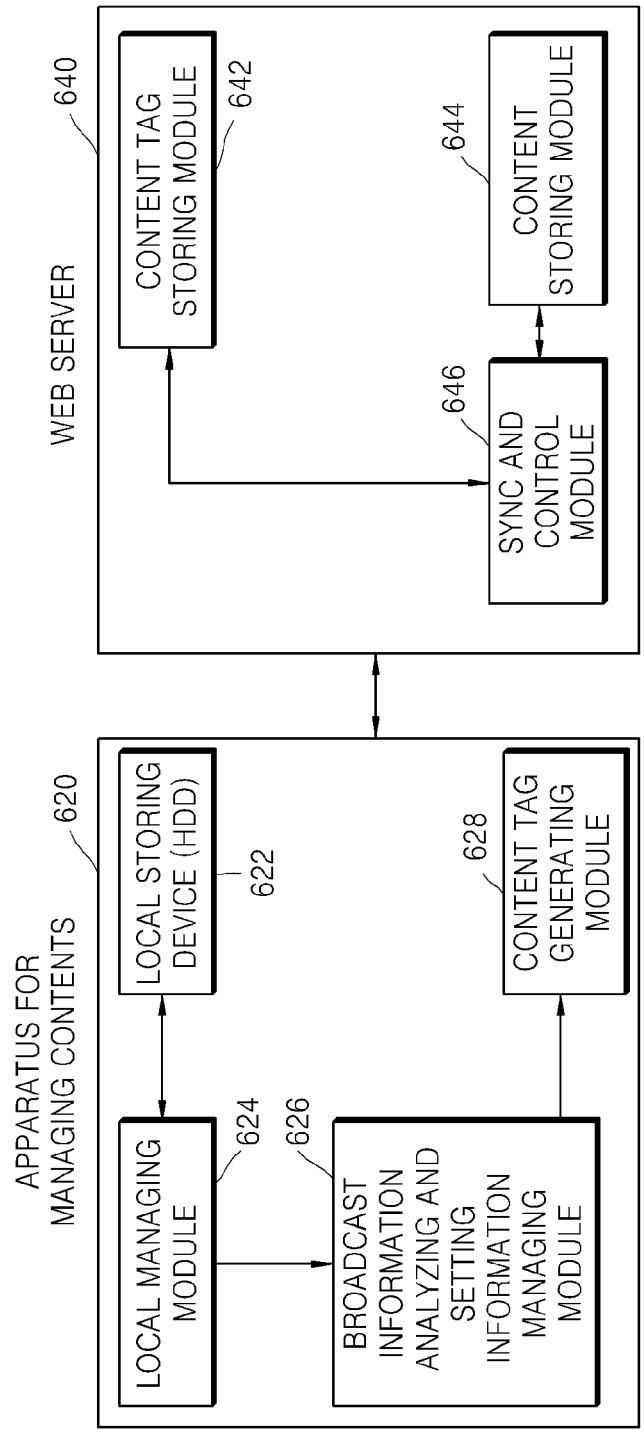
FIG. 6 illustrates an apparatus for managing contents by using a content tag, and a web server, according to an exemplary embodiment of the present invention.

FIG. 6 illustrates an apparatus 620 for managing contents by using a content tag and a web server 540, according to an exemplary embodiment of the present invention.

The apparatus 620 includes a local storing device 622, a local managing module 624, a broadcast information analyzing and setting information managing module 626, and a content tag generating module 628. The web server 640 includes a content tag storing module 642, a content storing module 644, and a sync and control module 646.

The local storing device 622 includes a storing device such as an HDD, and stores at least one content.

The local managing module 624 downloads a new content from the web server 640, and determines whether the local storing device 622 has a free space for storing the downloaded new content. If there is free space in the local storing device 622, the local managing module 624 stores the new content in the local storing device 622.

Otherwise, if there is no free space in the local storing device 622, the local managing module 624 selects content to be stored in the web server 640 from contents which are currently stored in the local storing device 622. Selection of the content may be performed in a predetermined deletion priority order or by using a selection signal input from the user. Alternatively, a new content to be stored may be selected.

The broadcast information analyzing and setting information managing module 626 analyzes and extracts information of the content selected by the local managing module 624. According to an exemplary embodiment of the present invention, the information of the selected content may be content metadata information and further include content setting information.

The content metadata information includes at least one of a content ID of stored content, a content storage start time, and a content storage end time. The content setting information includes at least one of content advertisement selection information, additional data selection information, and content quality selection information.

The content tag generating module 628 generates a content tag by using the information of the content analyzed and extracted by the broadcast information analyzing and setting information managing module 626.

The local managing module 624 determines whether the selected content exists in the web server 640. The content selected for deletion may not exist in the web server 640 or the quality of the content stored in the web server 640 may be different from that of the content stored in the local storing device 622.

If the local managing module 624 determines that either content which is identical to the selected content or content of the same quality does not exist in the web server 640, the local managing module 624 stores a content tag for the selected content in the local storing device 622 and then transmits the content tag to the web server 640. The local managing module 624 also uploads the selected content to the web server 640 and deletes the selected content from the local storing device 622.

Otherwise, if the local managing module 624 determines that content which is identical to the selected content or content of the same quality exists in the web server 640, the local managing module 624 stores the content tag for the selected content in the local storing device 622 and transmits the content tag to the web server 640 and deletes the selected content from the local storing device 622.

Thereafter, the local managing module 624 stores the new content in the local storing device 622. If the selected content is a new content to be stored, only the local managing module 624 stores the content tag.

In the web server 640, the content tag storing module 642 stores a content tag received from the apparatus 620, and the content storing module 644 stores content received from the apparatus 620.

The sync and control module 646 is in charge of sync between content tag information stored in the content tag storing module 642 and content stored in the content storing module 644, and performs a predetermined authentication procedure at a content providing request from the apparatus 620 and then transmits the requested content to the apparatus 620.

If the web server 640 receives a request for downloading content stored in the content storing module 644 from the apparatus 620, the sync and control module 646 performs user authentication by using user information of the content tag received from the apparatus 620. In the current exemplary embodiment of the present invention, only an authorized user can use, i.e., download content. However, selectively, if content corresponding to a content tag is stored in the content storing module 644 without a user authentication procedure, the content may be transmitted to the apparatus 620.

The apparatus 620 accesses the web server 640 by using web server information of the content tag, i.e., a uniform resource locator (URL) address or name of the web server 640.

Figure 7:
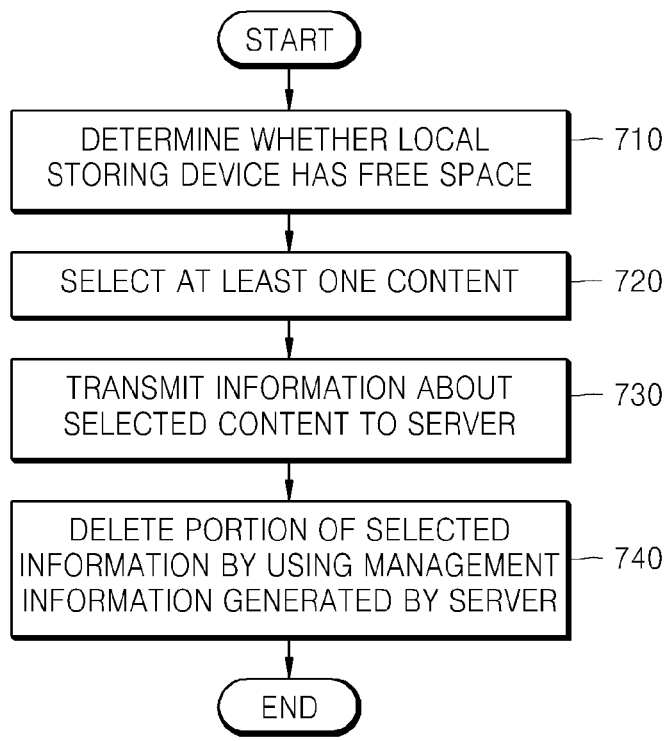
FIG. 7 is a flowchart illustrating a method of managing contents by using a peer-to-peer (P2P) scheme, according to an exemplary embodiment of the present invention.

FIG. 7 is a flowchart illustrating a method of managing contents by using a P2P scheme, according to an exemplary embodiment of the present invention.

In operation 710, a processor of a user device determines whether a local storing device has a free space for storing a new content. If so, the new content is stored in the local storing device.

Otherwise, if there is no free space in the local storing device, at least one content is selected from contents currently stored in the local storing device. Selection of the content may be performed in a predetermined deletion priority order or by using a selection signal input from the user. Selectively, a new content to be stored may be selected.

In operation 720, information about the selected content is transmitted to a web server to cause the web server to generate management information including information about external storing devices which store at least a portion of the selected content and including contents stored by the external storing devices. The management information includes at least one of the information about the external storing devices, information about the contents stored by the external storing devices, and information about the qualities of the contents stored in the external storing devices.

In operation 730, by using the management information generated by the web server, portions of the selected content, which are stored in the external storing devices managed by the web server and thus are downloadable when necessary, are deleted from the local storing device. If a new content to be stored is selected, only portions of the new content except for the downloadable portions are stored in the local storing device.

Figure 8:
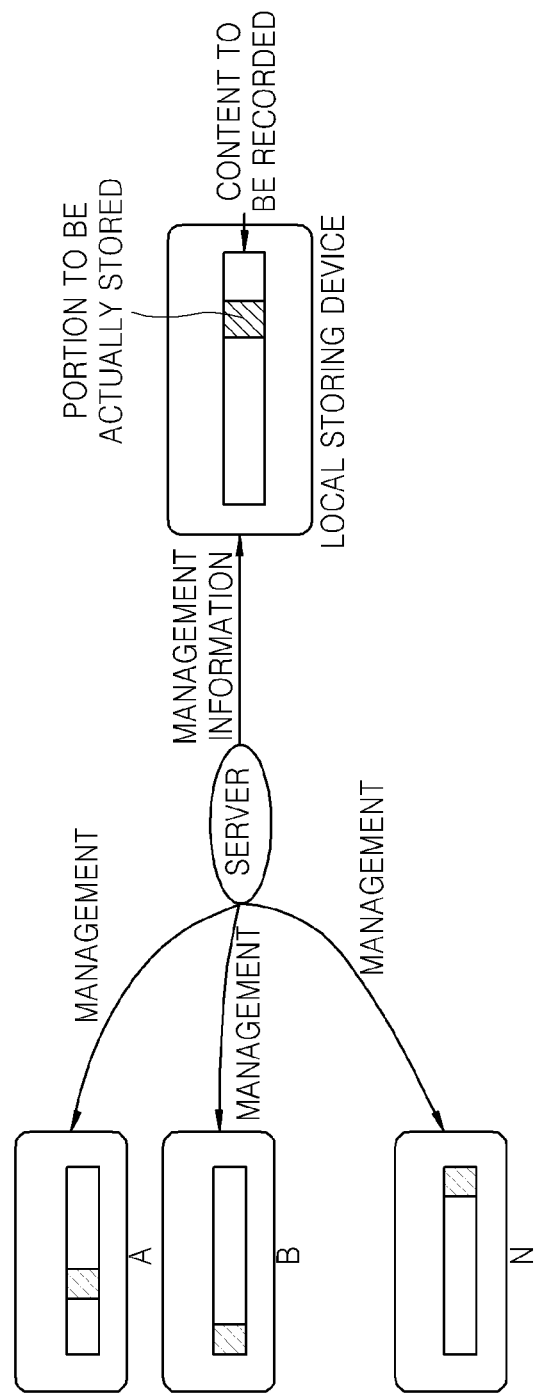
FIG. 8 is a schematic diagram for explaining a method of managing contents by using a P2P scheme, according to an exemplary embodiment of the present invention.

As shown in FIG. 8, only portions of content except for portions A, B, . . . , N stored in the external storing devices are actually stored and content tag information including information about the portions A, B, . . . , N which are not stored in the local storing device is generated and stored in the local storing device and transmitted to the web server. Thereafter, if the user desires to reproduce the content, the stored content tag information is transmitted to the web server to receive the portions stored in the external storing devices and thus the entire content is reproduced.

Selectively, it is also possible to download required content data from the external storing devices by using the management information provided by the web server, without transmitting the content tag information to the web server.

In this way, by managing contents with the P2P scheme, only portions except for portions which are downloadable when necessary are stored in the local storage device of the user device, thereby efficiently using the storage space of the user device and improving user convenience.

Figure 9:
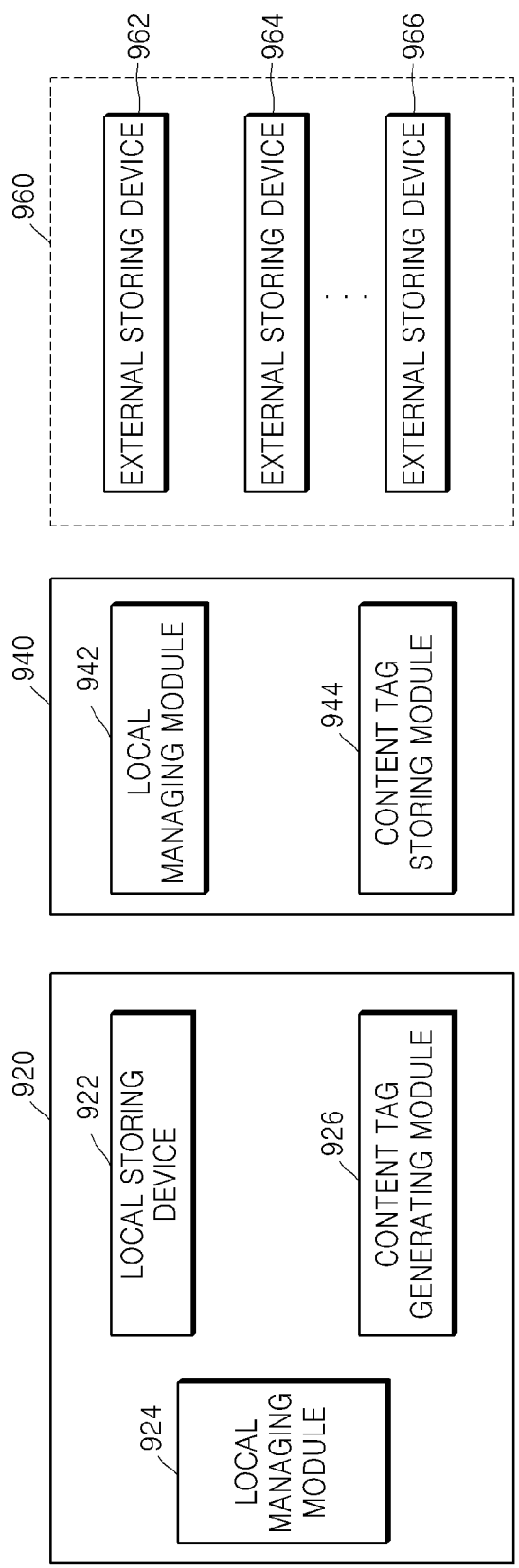
FIG. 9 is a block diagram of an apparatus for managing contents by using a P2P scheme, according to an exemplary embodiment of the present invention.

FIG. 9 is a block diagram for explaining a method of managing contents by using a P2P scheme, according to an exemplary embodiment of the present invention.

Referring to FIG. 9, an apparatus 920 for managing contents includes a local storing device 922, a local managing module 924, and a content tag generating module 926.

A P2P server 940 includes a content managing module 942 which manages contents stored in external storing devices 962, 964, and 966, and a content tag storing module 944 for storing content tags.

The local storing device 922 of the apparatus 920 stores at least one content.

The local managing module 924 determines whether the local storing device 922 has a free space for storing a new content. If the local managing module 924 determines that the local storing device 922 has a free space, the local managing module 924 stores the new content in the local storing device 922.

Otherwise, if the local managing module 924 determines that the local storing device 922 has no free space, the local managing module 924 selects at least one of the contents which are currently stored in the local storing device 922. Selection of the content may be performed in a predetermined deletion priority order or by using a selection signal input by the user. Alternatively, a new content to be stored may be selected.

The content tag generating module 926 generates and transmits information about the selected content to the P2P server 940. Selectively, the content tag generating module 926 further includes a separate functional unit which executes a function of the broadcast information analyzing and setting information managing module 626 shown in FIG. 6.

The content managing module 942 of the P2P server 940 searches the external storing devices 962, 964, and 966 which store at least a portion of the content by using the received content information. The content managing module 942 provides management information regarding the contents stored in the external storing devices 962, 964, and 966 to the apparatus 920. The management information includes at least one of the information about the external storing devices 962, 964, and 966, information about the contents stored by the external storing devices 962, 964, and 966, and information about the qualities of the contents stored in the external storing devices 962, 964, and 966.

The local managing module 924 deletes portions of the selected content, which are stored in the external storing devices 962, 964, and 966 and thus are downloadable when necessary, by using the management information generated by the P2P server 940. If a new content to be stored is selected, only portions of the new content except for the downloadable portions are stored in the local storing device 922.

As shown in FIG. 8, only portions of content except for portions A, B, . . . , N stored in the external storing devices are actually stored, and content tag information including information about the portions A, B, . . . , N which are not stored in the local storing device 922 is generated and stored in the local storing device 922 and transmitted to the P2P server 940.

The content managing module 942 of the P2P server 940 stores the received content tag information in the content tag storing module 944.

Thereafter, if the user desires to reproduce the content, the apparatus 920 transmits the content tag information stored in the local storing device 922 to the P2P server 940, and the content managing module 942 of the P2P server 940 performs a control operation to transmit the contents stored in the external storing devices 962, 964, and 966 to the apparatus 920 by using content information of the received content tag information. Selectively, the content managing module 942 of the P2P server 940 performs user authentication by using user information of the content tag information to allow only an authorized user to download the content.

Meanwhile, the exemplary embodiments of the present invention can be embodied as a program that can be implemented on computers and embedded devices and can be implemented on general-purpose digital computers that execute the program using recording media. Examples of the recording media include magnetic storage media such as read-only memory (ROM), floppy disks, and hard disks, and optical data storage devices such as CD-ROMs and digital versatile discs (DVD).

While the present invention has been particularly shown and described with reference to exemplary embodiments thereof, it will be understood by one of ordinary skill in the art that various changes in form and detail may be made therein without departing from the spirit and scope of the present invention as defined by the following claims. Accordingly, the disclosed embodiments should be considered in a descriptive sense not in a restrictive sense. The scope of the present invention will be defined by the appended claims, and differences within a scope equivalent to the appended claims should be construed to be included in the present invention.

What is claimed is:

1. A method of managing contents by using a content tag, the method being performed by a user device and comprising:
   selecting, by a processor, content received from a service provider, at least one portion of which is transmitted and saved in an external device, from among a plurality of contents as selected content based on a predetermined deletion priority order of the plurality of contents, in response to determining additional capacity of a storage device is required;
   generating a content tag comprising user authentication information and content information associated with the selected content;
   storing the generated content tag in the storage device for using content;
   transmitting, in response to determining at least one portion of the selected content does not exist in the external device, the at least one portion of the selected content to the external device;
   transmitting, after the generated content tag is stored, the stored content tag to the external device; and
   deleting, after the stored content tag is transmitted, the at least one portion of the selected content transmitted to the external device, the selected content being associated with the stored content tag,
   wherein the stored content tag is used to allow only an authorized user to retrieve and reproduce the at least one portion of the selected content saved in the external device, and
   wherein the transmitting the at least one portion of the selected content to the external device comprises selecting whether to store an advertisement or additional data, which is stored with the content in the storage device and received from the service provider, with the content in the external device.

2. The method of claim 1, wherein the predetermined deletion priority order is determined by a server or a user.

3. The method of claim 1, wherein the content information comprises content metadata information which comprises at least one of a content identification (ID), a content storage start time, and a content storage end time.

4. The method of claim 1, wherein the content information comprises content setting information which comprises at least one of content advertisement selection information, additional data selection information, and content quality selection information.

5. The method of claim 1, further comprising:
   requesting content transmission by transmitting a content tag corresponding to the deleted at least one portion of the selected content, to the external device; and
   receiving the deleted at least one portion of the selected content from the external device.

6. An apparatus for managing contents by using a content tag, the apparatus comprising:
   a storing device which stores a plurality of contents;
   one or more processors;
   at least one memory; and
   one or more programs,
   wherein the one or more programs are stored in the at least one memory and executed by the one or more processors, and the one or more programs cause the one or more processors to:
   select content received from a service provider, at least one portion of which is transmitted and saved in an external device, from among the plurality of contents, as selected content based on a predetermined deletion priority order of the plurality of contents, in response to determining additional capacity of the storing device is required,
   select whether to store an advertisement or additional data, which is stored with the content in the storing device and received from the service provider, with the content in the external device,
   generate a content tag comprising user authentication information and content information associated with the selected content, and
   store the generated content tag in the storing device for using content, transmit, in response to determining at least one portion of the selected content does not exist in the external device, the at least one portion of the selected content to the external device, copy the stored content tag, transmit the copied content tag to the external device, and delete the at least one portion of the selected content at the apparatus,
   wherein the stored content tag is used to allow only an authorized user to retrieve and reproduce the at least one portion of the selected content saved in the external device.

7. The apparatus of claim 6, wherein the predetermined deletion priority order is determined by a server or a user.

8. The apparatus of claim 6, wherein the content information comprises content metadata information which comprises at least one of a content identification (ID), a content storage start time, and a content storage end time.

9. The apparatus of claim 6, wherein the content information comprises content setting information which comprises at least one of content advertisement selection information, additional data selection information, and content quality selection information.

10. The apparatus of claim 6, wherein the one or more processors transmit a content tag corresponding to the deleted at least one portion of the selected content to the external device and receive the deleted at least one portion of the selected content from the external device.

11. A method of managing contents by using a content tag, the method being performed by a user device and comprising:
selecting, by a processor, content received from a service provider, at least one portion of which is transmitted and saved in an external storage device, from among a plurality of stored contents, as selected content, based on a predetermined deletion priority order of the plurality of stored contents, in response to determining additional capacity of a storing device is required;
transmitting, in response to determining at least one portion of the selected content does not exist in the external storage device, the at least one portion of the selected content to the external storage device;
transmitting information associated with the selected content to a server;
receiving management information comprising information about the external storage device which stores the at least one portion of the selected content, from the server; and
deleting the at least one portion of the selected content by using the management information,
wherein the management information is used to allow only an authorized user to retrieve and reproduce the at least one portion of the selected content saved in the external storage device, and
wherein the transmitting the at least one portion of the selected content to the external storage device comprises selecting whether to store an advertisement or additional data, which is stored with the content in the storing device and received from the service provider, with the content in the external storage device.

12. The method of clam 11, wherein the management information comprises at least one of the information about the external storage device which stores the at least one portion of the selected content, information about contents stored in the external storage device, and information about qualities of the contents stored in the external storage device.

13. The method of claim 11, further comprising generating and storing a content tag comprising information about the deleted at least one portion of the selected content, and transmitting the content tag to the external storage device.

14. An apparatus for managing contents by using a content tag, the apparatus comprising:
a storing device which stores a plurality of contents;
one or more processors;
at least one memory; and
one or more programs,
wherein the one or more programs are stored in the at least one memory and executed by the one or more processors, and the one or more programs cause the one or more processors to:
select content received from a service provider, at least one portion of which is transmitted and saved in an external storage device, from among the plurality of contents, as selected content, based on a predetermined deletion priority order of the plurality of contents, in response to determining additional capacity of the storing device is required and transmit, in response to determining at least one portion of the selected content does not exist in the external storage device, the at least one portion of the selected content to the external storage device,
select whether to store an advertisement or additional data, which is stored with the content in the storing device and received from the service provider, with the content in the external storage device,
transmit information associated with the selected content to a server,
receive management information comprising information about the external storage device which stores the at least one portion of the selected content from the server, and
delete the at least one portion of the selected content by using the management information,
wherein the management information is used to allow only an authorized user to retrieve and reproduce the at least one portion of the selected content saved in the external storage device.

15. The apparatus of claim 14, wherein the management information comprises at least one of the information about the external storage device which stores the at least one portion of the selected content, information about contents stored in the external storage device, and information about qualities of the contents stored in the external storage device.

16. The apparatus of claim 14, wherein the one or more processors generate a content tag comprising information about the deleted at least one portion of the selected content, and transmit the content tag to the external device.

17. A non-transitory computer-readable recording medium having recorded a program to execute a method of managing contents by using a content tag, the method being performed by a user device and comprising:
selecting, by a processor, content received from a service provider, at least one portion of which is transmitted and saved in an external device, from among a plurality of contents, as selected content based on a predetermined deletion priority order of the plurality of contents, in response to determining additional capacity of a storing device is required;
generating a content tag comprising user authentication information and content information associated with the selected content;
storing the generated content tag in the storing device for using content;
transmitting, in response to determining at least one portion of the selected content does not exist in the external device, the at least one portion of the selected content to the external device;
transmitting, after the generated content tag is stored, the stored content tag to the external device; and
deleting, after the stored content tag is transmitted, the at least one portion of the selected content transmitted to the external device, the selected content being associated with the stored content tag,
wherein the stored content tag is used to allow only an authorized user to retrieve and reproduce the at least one portion of the selected content saved in the external device, and
wherein the transmitting the at least one portion of the selected content to the external device comprises selecting whether to store an advertisement or additional data, which is stored with the content in the storing device and received from the service provider, with the content in the external device.

18. A non-transitory computer-readable recording medium having recorded a program to execute a method of managing contents by using a content tag, the method being performed by a user device and comprising:

selecting, by a processor, content received from a service provider, at least one portion of which is transmitted and saved in an external storage device, from among a plurality of stored contents, as selected content, based on a predetermined deletion priority order of the plurality of stored contents, in response to determining additional capacity of a storing device is required;

transmitting, in response to determining at least one portion of the selected content does not exist in the external storage device, the at least one portion of the selected content to the external storage device;

transmitting information associated with the selected content to a server;

receiving management information comprising information about the external storage device which stores the at least one portion of the selected content, from the server; and deleting the at least one portion of the selected content by using the management information, wherein the management information is used to allow only an authorized user to retrieve and reproduce the at least one portion of the selected content saved in the external storage device, and wherein the transmitting the at least one portion of the selected content to the external device comprises selecting whether to store an advertisement or additional data, which is stored with the content in the storing device and received from the service provider, with the content in the external storage device.

* * * * *